United States Patent [19]

Mutchler et al.

[11] Patent Number: 5,056,046

[45] Date of Patent: Oct. 8, 1991

[54] PNEUMATIC OPERATED VALVE DATA ACQUISITIONER

[75] Inventors: John H. Mutchler, Enfield; Timothy P. Jaeger, North Granby; Richard J. Matt, Avon; Theodore B. Farver, Windsor Locks, all of Conn.

[73] Assignee: Combustion Engineering, Inc., Windsor, Conn.

[21] Appl. No.: 610,450

[22] Filed: Nov. 8, 1990

Related U.S. Application Data

[63] Continuation-in-part of Ser. No. 368,604, Jun. 20, 1989, abandoned.

[51] Int. Cl.[5] .......................... H04N 7/18; F16K 31/02; G01M 19/00

[52] U.S. Cl. .......................... 364/551.01; 251/129.01; 358/107; 73/168; 382/8; 137/551

[58] Field of Search .................. 364/551.01, 550, 558, 364/559, 571.01; 251/3, 77, 129.01, 129.03, 129.09; 358/101, 106, 107; 73/68, 862.27, 862.49, 862.51; 137/551-554, 556

[56] References Cited

U.S. PATENT DOCUMENTS

| | | | |
|---|---|---|---|
| 4,428,228 | 1/1984 | Banzhaf et al. | 73/168 X |
| 4,542,649 | 9/1985 | Charbonneau et al. | 73/168 |
| 4,570,903 | 2/1986 | Crass | 73/862.31 |
| 4,690,003 | 9/1987 | McNennamy | 73/168 X |
| 4,694,390 | 9/1987 | Lee | 251/129.01 X |
| 4,725,884 | 2/1988 | Gurnell et al. | 358/107 |
| 4,799,175 | 1/1989 | Sano et al. | 364/571.01 X |
| 4,805,451 | 2/1989 | Leon | 73/168 |
| 4,831,873 | 5/1989 | Charbonneau | 73/168 |
| 4,851,903 | 7/1989 | Ikeda et al. | 358/107 X |
| 4,869,102 | 9/1987 | Hale et al. | 364/550 X |

*Primary Examiner*—Joseph L. Dixon

*Attorney, Agent, or Firm*—Chilton, Alix & Van Kirk

[57] ABSTRACT

The system (12′,14) includes a target member (78) associated with the stem valve (24) and displaceable therewith, and a camera (68) adapted to be positioned adjacent the stem for generating a video signal of at least a portion of the target member. A marker (80) associated with the valve in the field of view of the camera is provided for defining a reference displacement scale (82) in the video signal. A converter (62) is responsive to the video signal for generating target data commensurate with the absolute displacement of the target. First data interface equipment (42,58,60) is provided for digitizing the sensed pneumatic pressure as the pressure is changed to displace the stem, preferably a full stroke from the open-to-close-to-open positions or vice versa. Second data interface equipment (44,62) is provided for digitizing the target data commensurate with the displacement of the target. In a preferred embodiment, the displacement of the target member (78) is determined by electronically counting the scan lines or sequence of pixels (92–108) associated with the video signal, which are covered or uncovered, or otherwise interrupted, as the target member is displaced.

27 Claims, 2 Drawing Sheets

PNEUMATIC OPERATED VALVE DATA ACQUISITIONER

This is a continuation-in-part of co-pending application Ser. No. 0/368,604 filed on June 20, 1989, now abandoned.

BACKGROUND OF THE INVENTION

The present invention relates to the testing of valves, and more particularly, to the acquisition of characteristic data for pneumatic operated valves in the field.

During the past few years, the nuclear power industry has begun to realize the consequence of valve misapplication, improper actuator setup, undersized actuators, and inadequate maintenance. As a result, many operators of nuclear power plants are interested in acquiring database systems by which the base line characteristics of individual valves are stored, and compared with measurements of valve characteristics taken on a periodic basis, whereby deviations from the base line characteristics imply the need for particular maintenance or corrective actions on a valve-by-valve basis. By identifying those valves that need attention well before mis-operation can have an impact on plant safety or performance, the plant operator can safely avoid the overly conservative approach of disassembling and rebuilding every valve on a periodic basis regardless of actual condition.

Known techniques are not well adapted for the accurate determination of the operating characteristic of valve stem displacement as a function of applied air pressure in pneumatic operated valves. More particularly, a pneumatic valve, which operates in a relatively straight-forward, uncomplicated manner, should be amenable to an inexpensive, easily implemented technique for acquiring stem displacement data.

SUMMARY OF THE INVENTION

It is thus an object of the present invention to provide a data acquisition system by which the linear displacement of an operator component can easily and accurately be related to the change in actuating variable.

It is a particular object of the invention to provide a system for measuring the stem displacement in a pneumatic operated valve, as a function of air pressure applied to the valve operator.

It is a further object that such system be portable and readily deployed for use by technicians in the field, without the need to disconnect the valve from the process line or to attach sensors or gauges to the stem.

It is yet another object that the user of such system avoid the necessity to link the displaceable stem to the valve body through the displacement detection device, and avoid the necessity to precisely install, align, or calibrate the detection device or devices when they are installed on or at the valve.

The system in accordance with the invention includes a target member associated with the stem and displaceable therewith, and a camera adapted to be positioned adjacent the stem for generating a video signal of at least a portion of the target member. Marker means associated with the valve in the field of view of the camera are provided for defining a reference displacement scale in the video signal. A converter is responsive to the video signal for generating target data commensurate with the absolute displacement of the target. First data interface means are provided for digitizing the sensed pneumatic pressure as the pressure is changed to displace the stem, preferably over a full stroke from the open-to-close-to-open positions or vice versa. Second data interface means are provided for digitizing the target data commensurate with the displacement of the target. The digitized data are stored, preferably with a computer and associated random access memory, and can later be uploaded for use in, for example, the plant database system.

In a preferred embodiment, the displacement of the target member is determined by electronically counting the scan lines or sequence of pixels associated with the video signal, which are covered or uncovered, or otherwise interrupted, as the target member is displaced.

The camera, air pressure transducer and first and second interface means, computer, converter, a keyboard, and a battery power pack are all mounted within a suitcase-size portable box or container. Alternatively, the camera or other components may be connected to the computer and converter within the container, but removable during inspection for convenient positioning near the valve.

It should be appreciated that one of the limitations on human performance encountered by technicians in nuclear power plants, is the radioactivity in the fluids, fluid lines, and hydraulic components such as valves or the like. Accordingly, diagnostic or other tests performed on many of the valves in the plant, must be set up and conducted while the technicians wear rubber gloves or similar protective clothing. This, of course, limits their dexterity. For this reason, it is an object of the present invention that in acquiring the required data, the technician avoid the necessity for precisely placing, aligning or calibrating sensors or detectors at the valve.

Thus, one of the major advantages of the present invention is the self-calibration accomplished by the camera, without the need for the technician's precision placement of detector components on the valve. The target on the stem is either conventionally carried by the stem, or can be placed thereon in a somewhat arbitrary fashion. The marker of absolute length must, of course, be rather precisely fabricated, but it may be placed on the valve so as to appear anywhere in the field of view of the camera, preferably with the target simultaneously in view.

The technique of the present invention may be contrasted in this respect from, for example, the use of an LVDT or similar displacement measuring devices. LVDT's suitable for use in the environment of the present invention, typically are available as a unitary device which must be connected at one end to the valve yoke, and at the other end to the valve stem. The moving core connected to the stem moves within the stationary coil connected to the yoke. In order for the core and coil to be aligned, the LVDT device must be precision mounted between the stem and yoke as well as calibrated on line, in a manner that is much more complicated than that available with the present invention. With the LVDT, the mounting of one (core) end to the stem is thus not independent of the mounting of the other (coil) end to the yoke. These two mountings must be closely coordinated and aligned. In contrast, with applicant's invention, the camera can be any convenient distance from the valve stem, and the absolute distance marker can be located substantially anywhere on, for example, the yoke. The only substantial care in mounting required on the part of the technician using the present invention is to assure that the vertical component of the video signal is substantially in parallel with the valve stem. This is readily accomplished at the camera support.

Thus, in a general sense, the invention is directed to a method for acquiring characteristic pressure and stem displacement data from a pneumatic operated valve, by using a non-intrusive stem position monitoring device, i.e., the stem position monitoring is accomplished without the necessity for coupling the detectors to the stem and the valve by interdependent mounting.

In a more general sense, the method includes the steps of mounting a first detector member in fixed relation to the valve, and mounting a second detector member independently of a first detector member, for displacement commensurate with the stem displacement. In the illustrated embodiment, the first detector member is the CCD camera, which is fixed with respect to the valve, and the second detector member is the target carried by the displaceable stem. The method includes the further step of generating a sensor signal responsive to the displacement of the second detector member relative to the first detector member. In the illustrated embodiment, the sensor signal is a video signal by which the displacement is represented by a commensurate number of discrete pixels that are covered or uncovered by the moving target. A further step of the method includes generating a calibrated signal defining a quantitative relationship between the sensor signal and an absolute unit of linear measurement. This is accomplished by the self-calibration whereby a unique quantitative relationship is established between the absolute length of the marker, and the number of the pixels in the video signal that matches the length of the line defined by the marker. Thus, the calibration is accomplished without delicate manipulation by the technician of any equipment that is on the valve. Finally, digital values of pressure and absolute displacement are recorded and preferably digitally stored for use in a computer program by which the valve performance can be diagnosed.

It should be appreciated that, although the preferred embodiment of the invention has been shown in the form of a video camera with a screen measuring scale, other non-intrusive displacement measuring devices may be substituted with the present invention. Preferably, the non-intrusive displacement measuring devices rely on sensing changes in electromagnetic waves sensed at the first detector, due to the displacement of the second detector. In the video, camera embodiment, these light waves are in the visible range, but this is not a necessity. Moreover, in the video camera embodiment described herein, the sensed electromagnetic waves are in the form of reflected light from existing diffuse illumination, or perhaps if necessary from a directed light source such as a lamp or the like. The invention can, however, be implemented with coherent or semi-coherent light sources associated with the first detector, as by projection toward and reflection from the second detector member in the form of a reflector.

It should be further appreciated that, although the preferred embodiment is described herein with respect to a pneumatic valve, the use of a non-intrusive displacement measurement device for obtaining data on the relationship between the valve actuating variable and stem displacement, is considered novel even with respect to other types of valves, e.g., solenoid, hydraulic, and motor operated. When these types of valves are used, for example, in a nuclear power plant, the technician must protect his hands and thus cannot easily install stem displacement monitors or detectors which require precise location, alignment, or calibration. As in the case of the acquisition of characteristic data for pneumatic operated valves, the video camera displacement detection system of the present invention, and its equivalents including other types of cameras and the like which are sensitive to the electromagnetic spectrum, particularly at or near the visible range of the spectrum, should be deemed within the scope of the present invention when used in the claimed manner for other types of valves.

Thus, the present invention is in its most general form, directed to a method of acquiring characteristic data regarding a valve that is connected to a process flow line in a plant, the valve having an actuator, a stem that is displaced along a linear path in response to a change in the actuating variable, and means responsive to the stem displacement for adjusting the flow through the line, wherein the characteristic data include the actuating variable and the stem displacement. The key aspect of the invention, is the mounting of a first detector member in fixed relation to the valve, and the mounting of a second detector member independently of the first detector member, for displacement commensurate with the stem displacement. The first detector is preferably sensitive to changes in the electromagnetic waves sensed at the first detector member, due to the displacement of the second detector member.

The valve data acquisition system in accordance with the invention is capable of obtaining signature traces, including the hysteresis loop for the stroking operation of an open yoked pneumatic operated valve. Off-nominal conditions of the valve which can affect the acquired data include a bent stem or other sources of excessive friction, deteriorating seals (packing) in the valve or operator, or a change in the zero position, due, for example, to a worn seat.

BRIEF DESCRIPTION OF THE DRAWINGS

These and other objects and advantages of the invention will be described below with reference to the accompanying drawings, in which.

DESCRIPTION OF THE PREFERRED EMBODIMENT

Figure 1:
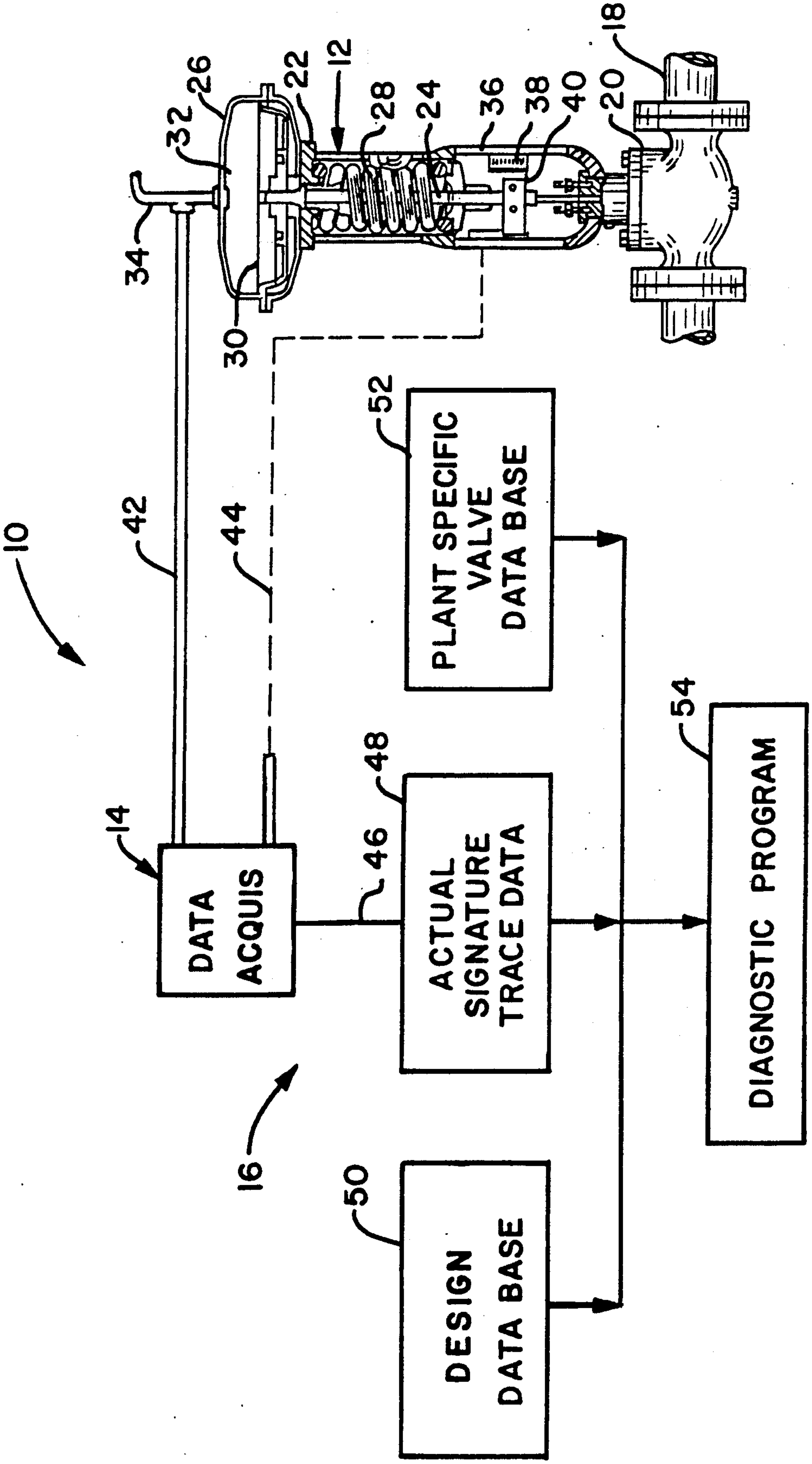
FIG. 1 is a schematic view of a valve database system with which the data acquisition system of the present invention would be employed.

FIG. 1 shows the context in which the present invention finds its most advantageous use. The underlying utility is that valve stem thrust can be determined by evaluating actuator pressure versus stem position. A plant valve diagnostic system 10 includes a multiplicity of individual valves, one of which is shown at 12, an individual valve data acquisition system 14, and a data analysis system 16.

A pneumatically operated valve 12 is shown connected to a process line 18 in, for example, a nuclear power plant. The valve 12 includes a body 20 containing a sealable passage through which line fluid may flow, and an operator 22 including a stem 24 for positioning sealing means in the passage and an actuator 26 for displacing the stem a stroke distance corresponding to the open and closed position of the sealing means. Typically, whether the valve is designed for an unpressurized open or unpressurized closed condition, the unpressurized or zero condition is maintained at a nonzero pressure to avoid initial lag or zero position drift. Smaller valves typically operate within the range of 3–15 psi, and larger valves in the range of 6–30 psi, with total stroke displacements of the stem ranging from a few inches up to two feet. A spring 28 is typically provided to counterbalance the "zero" pressure of, for example, 3 psi in the chamber 32, which is applied against diaphragm 30 connected to stem 24. A pressure fitting in line 34 is provided for chamber 32, and is connected to a conventional source of pressurized air (not shown).

The valve operator 22 typically has an open yoke 36 at its lower end, through which the stem 24 is visible and accessible. An identification plate 38 may also carry coarse gradations which, in conjunction with a pointer 40 attached to stem 24, permit visual observation of the open and closed stroke limits of the valve or a stem intermediate position. Typically, the gradations on plate 38 are no finer than approximately 1/16 of an inch and even the most careful observer would not likely be able to consistently read the scale to an accuracy within 1/32 of an inch.

It has been determined, however, that a diagnostic system of the type shown at 16 would require data indicative of the relationship between stem displacement and operator pressure, that has a resolution of 1/64 inch or better. Low-cost displacement measuring techniques of sufficient accuracy suitable for use on-line in the field, are not known to the inventors. Moreover, any displacement measuring technique should ideally minimize the cost of hardware, by avoiding the requirement for customizing each displacement detector for each valve, or for permanently mounting expensive hardware on each valve.

In FIG. 1, a sensor line 42 is shown having a connection at one end to fitting 34 for sensing the operator pressure and a sensor line 44 is shown generally leading to the valve yoke 36 for sensing the stem displacement. Lines 42 and 44 and the associated signal processing and data storage hardware within system 14, constitute the subject matter of the present invention. The technician can use one portable acquisition system 14 to collect data one valve at a time, with the collected data being automatically stored for later downloading through line 46 to the actual signature trace data processing block 48 of the analysis system 16. The signature or characteristic trace data of a particular valve is combined with design data contained in block 50 and information about the plant specific valves as contained in block 52, by the diagnostic program to help the plant operator identify valves that need immediate attention, plan a maintenance and replacement strategy, or otherwise monitor the condition of the inventory of on-line valves in the plant. The usefulness of the diagnostic system 10 strongly depends on the accuracy and resolution of the data recorded in the acquisition system 14.

Figure 2:
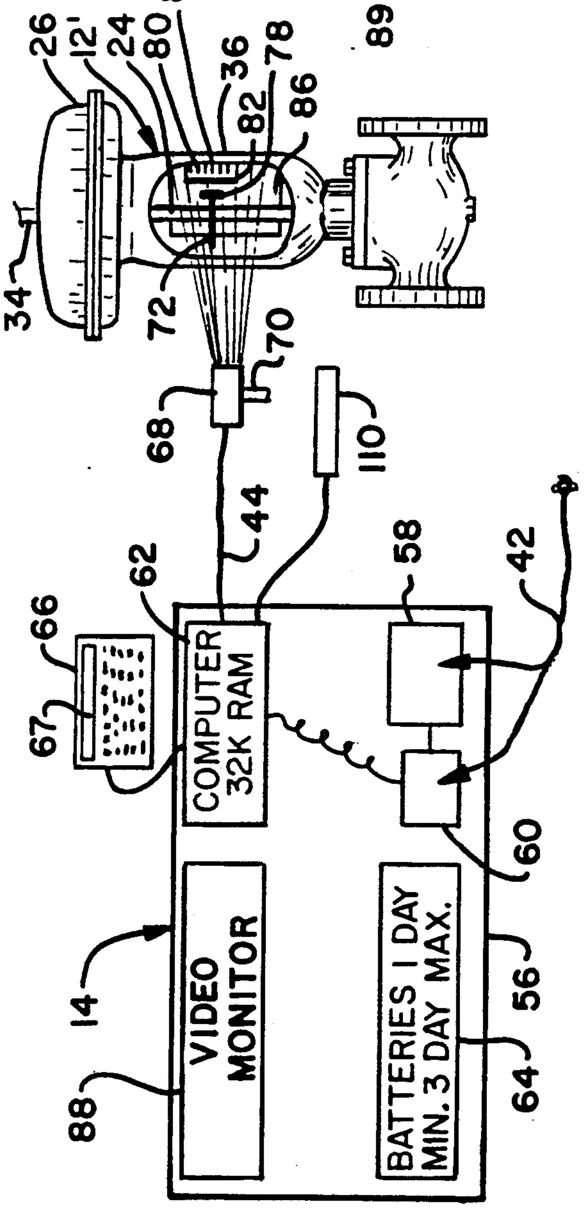
FIG. 2 is a schematic representation of the system in accordance with the present invention in use for acquiring data on a pneumatic operated valve.

FIG. 2 shows the data acquisition system 14 in accordance with the preferred embodiment of the invention. A suitcase-size insulated container 56 preferably carries an air pressure transducer 58 and associated transmitter 60 which are connected through line 42 and fitting 34 to the operator 26 of the valve 12'. The valve in FIG. 2 is indicated as 12' because it has certain modifications, to be described below, relative to the more conventional valve 12 as shown in FIG. 1. The pressure transmitter 60 is connected to a computer or processor 62 which includes a digital storage memory, for example, 32K RAM. A battery pack 64 is also carried within the container 56 with sufficient power to operate the computer, transducers and other equipment to be described below, continuously for a period of one to three days.

A human interface such as a keyboard 66 including CPU display 67 is connected to computer 62 and may either be permanently mounted within the container 56, or optionally be carried in the container only when not in use, and connectable through a plug or the like to the computer for use. The keyboard preferably has an alphanumeric set of keys by which the technician can record specific information concerning the appearance or operation of the valve, into the storage memory. Preprogrammed function keys such as "F1" can facilitate such recording.

In accordance with the invention, a camera 68 is connected to the computer through line 44 and includes support means 70 for positioning the camera in fixed relation to the valve 12', whereby the field of view of the camera includes a region within the valve yoke 36. In this region, the stem carries a disk 72 or other structure on which a target 78 is mounted for displacement commensurate with the linear displacement of stem 24. A marker 80 is affixed to the yoke 36 and includes one edge 82 which is preferably darkened and is known to have a precise length, for example, two inches. The marker 80 may also include valve identification data, preferably in the form of bar code as shown at 84. The camera 68 is positioned adjacent the yoke 36, such that the camera lens is approximately spaced a predetermined distance from the stem 24. A white card or the like 86 can be temporarily attached to the valve, or the marker 80 can include a white surface, such that the white surface spans the vertical path to be traversed by the target 78 as the stem 24 passes through a full stroke.

Figure 3:
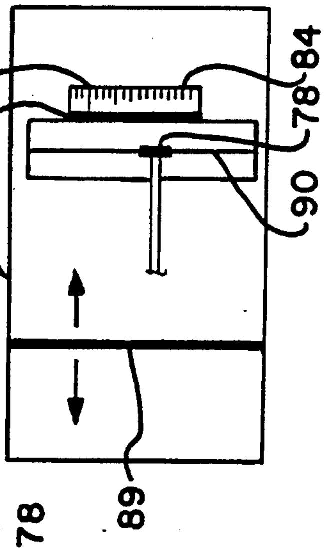
FIG. 3 is an enlarged schematic view of one screen display as viewed by the technician gathering data, wherein the target member connected to the stem and a reference marker for calibration are visible.
Figure 5:
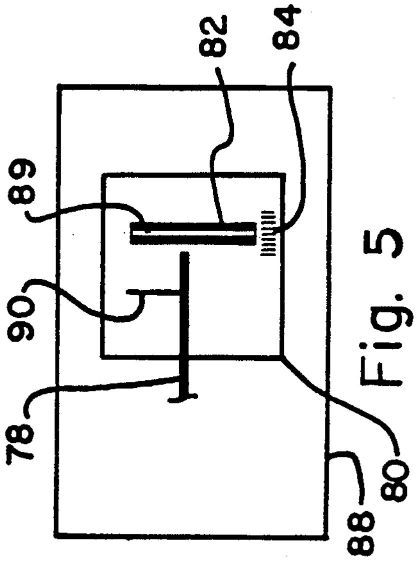
FIG. 5 is an enlarged schematic view of an alternative screen display for calibration.

Preferably, the technician can observe a video image displayed in video monitor 88 within container 56, an enlarged schematic view of which is shown in FIGS. 3 or 5. The stem 24 and other structures which might be visible in actual use have been omitted for clarity in FIG. 3.

In the preferred embodiment, the displacement of target 78 is determined electronically as follows. The camera 68 generates a composite video signal which through the television interface, or converter, associated with computer 62, is recognized as a series of points in a plurality of vertically spaced horizontal lines, or as a coordinate location in a video matrix. In any event, the converted video signal can be considered as made up of a multiplicity of pixels, each of which is either black or white. The system 14 calibrates itself so that in the converted video signal, the number of vertically aligned pixels that represents the exact span of black line 82, is determined. The known reference calibration pixel count can be compared to the displacement pixel count to provide a calibrated relative displacement measurement.

Part of the calibration step can include the electronic generation of a monitor line 89 which is precisely vertical relative to the screen display 88. In practice, valve operators 26 and stems 24 are not always precisely vertically oriented in the field and the monitor line can be controlled to move to the left and to the right in the display screen 88 such that the camera can be tilted and the monitor calibration line 89 moved, until the monitor calibration line 89 lies exactly over the reference line 82 on marker 80. A particular vertical series of pixels or equivalent discrete points 90 are electronically designated as the displacement measuring path. This path can be highlighted as at 90 so the technician can assure that the target 78 initially covers at least one of the pixels or points along path 90. Alternative monitor displays for calibration are shown in FIGS. 3 and 5.

Figure 4B:
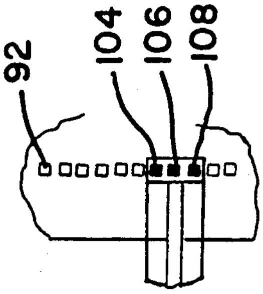
FIGS. 4(*a*) and (*b*) are schematic illustrations of the preferred technique for electronically determining the absolute displacement of the target as connected to the stem, resulting from a change in air pressure applied to the operator.
Figure 4A:
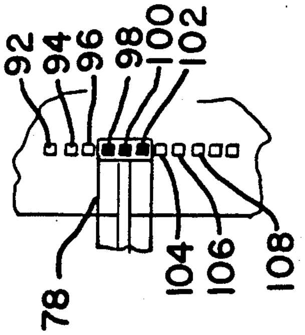

As shown in FIGS. 4*a* and 4*b*, when the stem is displaced, the target 78 moves from an arbitrary initial position at which pixels 98, 100 and 102 from among pixels 92–106 are covered, to another position in which the pixels 104, 106 and 108 are covered. The sequential covering, or uncovering, of pixels in the path 90 is counted in the computer 62 and, based on the reference calibration, the relative or absolute movement of the target (i.e., stem) can be recorded with a resolution equivalent to that of a pixel, which is typically 1/64 inch or smaller. The additional details of the manner in which the linear displacement is counted electronically in accordance with the preferred embodiment may be obtained from the copending patent application entitled "Automated Flow Rotameter" filed by Theodore B. Farver on even date herewith, the disclosure of which is hereby incorporated by reference.

It should be appreciated, however, that other video image techniques can be used for computing and/or recording the stem displacement. In the preferred technique, the converter selects only a portion of the video signal represented by the path 90, without the need for further use of the marker line 82 once calibration has been completed. If the target 78 is of a precise length, it could equivalently serve as the marker calibration line 82.

As a reliable technique for assuring that the measured stem displacement will be associated with the correct valve, a bar code reader 110 coupled to the computer 62 can be used to scan the marker 80, thereby acquiring valve identification from the bar code 84. This also assures that the code must be scanned by the technician; the technician cannot use "old" data.

The identification data can be required as a prerequisite to the initiation of the pressure and displacement data, by means of control through the keyboard 66. The keyboard is coupled to the converter means, for setting the rate at which the pressure and displacement data are sensed and/or stored. Furthermore, the keyboard can provide for setting the duration of time during which data are generated and stored.

We claim:

1. A system for acquiring characteristic operating data regarding a pneumatic valve connected to fluid line, the valve having a body containing a sealable passage through which line fluid may flow, an operator including a stem for positioning sealing means in the passage, and an actuator for displacing the stem a stroke distance corresponding to the open and closed position of the sealing means, said system comprising:

means for sensing the pneumatic pressure in the operator as the stem is displaced over the stroke distance;

means responsive to the means for sensing, for generating pressure data commensurate with the pneumatic pressure in the operator as the stem is displaced over the stroke distance;

marker means associated with the valve and defining a known absolute distance;

a target member associated with the stem and displaceable therewith;

camera means adapted to be fixed in position adjacent the valve stem, for generating a video data signal of the marker means and the target member during the displacement of the stem over the stroke distance;

converter means responsive to the video signal for generating target data commensurate with the displacement of the target resulting from a change in operator pressure;

first data interface means for digitizing the sensed pneumatic pressure data;

second data interface means for digitizing the target data; and means for storing the digitized pressure and target data as first and second characteristic data, respectively.

2. The system of claim 1, further including a portable container enclosing at least the converter means, the means for generating pressure data, the first interface, the second interface, and the means for storing.

3. The system of claim 2, further including a monitor within the container and coupled to the converter means for displaying an image of the target and the marker from the video signal.

4. The system of claim 3, wherein the converter selects only portions of the video signal which exclude the marker means, for determining the displacement of the target.

5. The system of claim 2, wherein the converter selects only portions of the video signal which exclude the marker means, for determining the displacement of the target.

6. The system of claim 5, wherein said converter injects a calibration line in said image to indicate which of said portions of the video signal are used for determining the displacement of the target.

7. The system of claim 3, wherein, the means for generating pressure data, the camera means, the converter means and the first and second interface means are associated with a computer, and the system includes a human interface associated with the computer for setting the rate at which the stored data are acquired.

8. The system of claim 7, wherein the human interface provides for setting the duration of time during which data are generated and stored.

9. The system of claim 8, wherein the human interface means is mounted within the container.

10. A system for acquiring characteristic data regarding a device connected to an industrial process, the device having a visible stem and an actuator responsive to an actuating variable for displacing the stem, said system comprising:

means for sensing changes in the actuating variable as the stem is displaced;

means responsive to the means for sensing, for generating actuator data commensurate with the change in the actuating variable;

marker means associated with the device and defining a known reference distance;

a target member associated with the stem and displaceable therewith;

camera means adapted to be fixed in position adjacent the stem, for generating a video data signal of the marker means and the target member during the displacement of the stem;

converter means responsive to the video signal for generating target data commensurate with the displacement of the target resulting from a change in the actuating variable;

first data interface means for digitizing the actuator data;

second data interface means for digitizing the target data; and means for storing the digitized actuator and target data as first and second characteristic data, respectively.

11. The method of claim 10, wherein the step of calibrating includes attaching a marker of known length to the valve so that the video signal includes a representation of the marker.

12. The method of claim 11, wherein the step of attaching a marker includes permanently attaching the marker to a portion of the valve that does not move when the stem is displaced.

13. A method of acquiring characteristic data regarding a plurality of pneumatic valves that are each connected to a respective process flow line in a plant, each valve having a pneumatic pressure chamber, a visible stem that is displaced linearly in response to a change in the pressure in the chamber, and means responsive to the stem displacement for adjusting the flow through the line, wherein the characteristic data includes chamber pressure and stem displacement, comprising the steps of:

manually transporting a portable data acquisition unit from an arbitrary first location in the plant to a second location near one of the pneumatic valves, the unit including, a camera for continually generating a video signal, a converter coupled to the camera for processing the video signal including generating digital representations of changes in the video signal, means coupled to the converter for storing the digital representations, a pressure sensor, means associated with the pressure sensor for generating a digital representation of changes in pressure sensed by the sensor, a human interface for manually setting control parameters for the unit;

mounting the camera adjacent said one valve so that the video signal generated by the camera includes the visible stem;

connecting the pressure sensor to the pressure chamber;

calibrating the converter by selectively displacing the stem so that a given change in the video signal due to the displacement of the stem is converted into a digital value of absolute displacement;

setting the interface to initiate the generation and storage of digitized data values indicative of the pressure in the chamber, initiate the generation and storage of digitized data values indicative of the displacement of the stem, and terminate the storage of additional data values after a sufficient number of such values have been stored.

14. The method of claim 10, wherein the unit includes a symbolic code reader and the method includes the steps of, attaching a symbolic identification code to the valve, reading the code with the reader, and storing the valve identification as a digitized value associated with the pressure and displacement data values for the valve.

15. The method of claim 10 including the steps of attaching a target to the stem for displacement therewith along a linear path, recognizing the target and the path in the converter as a sequence of discrete video inputs, and determining the data value of the stem displacement by continually relating the discrete video inputs of the target to the discrete video inputs of the path.

16. A method of acquiring characteristic data regarding a valve that is connected to a process flow line in a plant, the valve having an actuator responsive to an actuating variable, a stem that is displaced in a linear path in response to the actuation of the actuator, and means responsive to the stem displacement for adjusting the flow through the line, wherein the characteristic data include the actuating variable and stem displacement, comprising the steps of:

positioning a data acquisition unit near the valve, the unit including, first means, sensitive to light, for continually generating an input signal commensurate with the light received in the light-sensitive portion of the first means;

second means coupled to the first means, for processing the input signal including generating digital representations of changes in the input signal, a sensor for said actuating variable, means associated with the sensor for generating a digital representation of the value of the actuating variable sensed by the sensor, memory means coupled to the second means, for storing the digital representations, and interface means for manually setting control parameters for the unit;

mounting the first means adjacent the stem of the valve so that the input signal generated by the first means is responsive to the displacement of the stem;

connecting the sensor to the actuator;

varying the actuating variable to displace the stem; and setting the interface means to initiate the generation and storage of digitized data values indicative of the actuating variable, and initiate the generation and storage of digitized data values indicative of the displacement of the stem.

17. The method of claim 16, wherein the first means includes a video camera and the step of mounting the first means includes mounting the camera so that the field of view of the camera includes the stem.

18. The method of claim 17, including the steps of attaching a target to the stem for displacement therewith along the linear path and recognizing the target and the path in said second means as a sequence of discrete video inputs.

19. A method of acquiring characteristic data regarding a valve that is connected to a process flow line in a plant, the valve having an actuator, a stem that is displaced on a linear path in response to a change in the actuation of the actuator, and means responsive to the stem displacement for adjusting the flow through the line, wherein the characteristic data include the actuating variable and stem displacement, comprising the steps of:

positioning a data acquisition unit near the valve, the unit including, first means, sensitive to light, for continually generating an input signal commensurate with the light received in the light-sensitive portion of the first means;

second means coupled to the first means, for processing the input signal including generating digital representations of changes in the input signal, a sensor for said actuating variable, means associated with the sensor for generating a digital representation of the value of the actuating variable sensed by the sensor, memory means coupled to the second means, for storing the digital representations, and interface means for manually setting control parameters for the unit;

mounting the first means adjacent the stem of the valve so that the input signal generated by the first means is responsive to the displacement of the stem;

connecting the sensor to the actuator;

varying the actuator variable to displace the stem;

calibrating the second means by selectively displacing the stem so that a given change in the input signal due to the displacement of the stem is converted into a digital value of absolute displacement;

setting the interface means to initiate the generation and storage of digitized data values indicative of the pressure in the chamber, and initiate the generation and storage of digitized data values indicative of the displacement of the stem.

20. The method of claim 19, wherein the first means includes a video camera and the step of mounting the first means includes mounting the camera so that the field of view of the camera includes the stem.

21. The method of claim 20, including the steps of attaching a target to the stem for displacement therewith along the linear path and recognizing the target and the path in said second means as a sequence of discrete video inputs.

22. A method of acquiring characteristic data regarding a valve that is connected to a process flow line in a plant, the valve having an actuator, a stem that is displaced on a linear path in response to a change in the actuating variable, and means responsive to the stem displacement for adjusting the flow through the line, wherein the characteristic data include the actuating variable and stem displacement, comprising the steps of:

mounting a sensor to the actuator;

mounting a first detector member in fixed relation to the valve;

mounting a second detector member independently of the first detector member, for displacement commensurate with the stem displacement, varying the actuator variable to displace the stem;

generating a sensor signal responsive to the displacement of the second detector member relative to the first detector member;

generating a calibrated signal defining a quantitative relationship between the sensor signal and an absolute unit of linear distance measurement;

generating a digital value of absolute displacement of the stem from the calibrated signal;

generating a digital value of the actuating variable from the sensor as the actuator variable is varied; and recording the digital values of stem displacement and actuating variable.

23. The method of claim 22, wherein the step of generating the sensor signal includes sensing changes in electromagnetic waves sensed at the first detector member due to the displacement of the second detector member.

24. The method of claim 23, wherein the step of generating a sensor signal includes sensing changes in the visible range of electromagnetic waves with a video camera having a field of view which includes the second detector member.

25. The method of claim 24, wherein the video camera generates a video image composed of a regular array of pixels and the step of generating a calibrated signal includes counting the number of linearly related pixels corresponding to a calibration marker of known absolute length that is in the field of view of the first detector member at the same time the second detector member is in said field of view.

26. The method of claim 22, wherein the steps of generating a sensor signal, generating a calibrated signal, and generating the digital values, are formed in a portable data acquisition unit located at the valve.

27. The method of claim 26, wherein the step of recording the digital values of stem displacement and chamber pressure includes storing the values in said portable unit.

* * * * *

UNITED STATES PATENT AND TRADEMARK OFFICE

CERTIFICATE OF CORRECTION

PATENT NO. : 5,056,046

DATED : October 8, 1991

INVENTOR(S) : John H. Mutchler, et al

It is certified that error appears in the above-indentified patent and that said Letters Patent is hereby corrected as shown below:

Column 7, line 62, after "to" insert --a--.

Column 9, line 23, "10" should be --13--.

Column 10, line 7, "10" should be --13--; line 15, "10" should be --13--; line 34, after "means," insert --including a video camera--; line 51, after "that" insert --the field of view of the camera includes the stem and--; delete lines 62 through 65; line 66, "17" should be --16--.

Column 12, line 49, "formed" should be --performed--.

Signed and Sealed this

Twelfth Day of November, 1996

Attest:

BRUCE LEHMAN

*Attesting Officer*

*Commissioner of Patents and Trademarks*